United States Patent
Isaacon et al.

(10) Patent No.: US 12,507,926 B2
(45) Date of Patent: Dec. 30, 2025

(54) VACUUM TUBE RECEIVER FOR DRAWING BLOOD THROUGH A PERIPHERAL IV CATHETER

(71) Applicant: Becton, Dickinson and Company, Franklin Lakes, NJ (US)

(72) Inventors: S. Ray Isaacon, Layton, UT (US); Megan Scherich, Salt Lake City, UT (US); Huy Tran, Riverton, UT (US); Cristian Clavijo, Lehi, UT (US); Joseph Spataro, Cottonwood Heights, UT (US); Curtis H. Blanchard, Riverton, UT (US); Jonathan Karl Burkholz, Salt Lake City, UT (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 1091 days.

(21) Appl. No.: 17/087,167

(22) Filed: Nov. 2, 2020

(65) Prior Publication Data

US 2021/0137433 A1    May 13, 2021

Related U.S. Application Data

(60) Provisional application No. 62/934,964, filed on Nov. 13, 2019.

(51) Int. Cl.
*A61B 5/15* (2006.01)
*A61B 90/00* (2016.01)

(52) U.S. Cl.
CPC .. *A61B 5/150061* (2013.01); *A61B 2090/034* (2016.02)

(58) Field of Classification Search
CPC ........ A61B 5/150061; A61B 2090/034; A61B 2090/0801; A61B 5/150396; A61B 5/150511; A61B 5/150572; A61B 5/15074; A61B 5/150946; A61B 5/150992; A61B 5/154; A61B 5/15003; A61B 5/15; A61B 5/150374; A61B 5/150381; A61B 5/150534
See application file for complete search history.

(56) References Cited

U.S. PATENT DOCUMENTS

| 3,848,579 A | 11/1974 | Villa-Real |
| 4,492,634 A | 1/1985 | Villa-Real |

(Continued)

FOREIGN PATENT DOCUMENTS

| CN | 204765667 U | 11/2015 |
| DE | 2908817 | 9/1980 |

(Continued)

*Primary Examiner* — Tse W Chen
*Assistant Examiner* — Evelyn Grace Park
(74) *Attorney, Agent, or Firm* — The Webb Law Firm

(57) ABSTRACT

A vacuum tube receiver can include a housing that has a proximal end and a distal end. The housing can include a hollow interior and a proximal opening for receiving a vacuum tube into the hollow interior. The distal end of the housing can form an adapter for coupling the vacuum tube receiver to an intravenous system. The vacuum tube receiver may also include one or more spikes that extend proximally into the hollow interior to form a blood flow path. The vacuum tube receiver can include a number of features to control the pressure and/or flowrate of blood into a vacuum tube.

15 Claims, 11 Drawing Sheets

(56) References Cited

U.S. PATENT DOCUMENTS

| | | |
|---|---|---|
| 5,181,523 A | 1/1993 | Wendelborn |
| 5,888,318 A | 3/1999 | Boyde |
| 2002/0019621 A1 | 2/2002 | Mathias et al. |
| 2003/0176813 A1 | 9/2003 | Mathias et al. |
| 2003/0208161 A1 | 11/2003 | Crawford |
| 2004/0127817 A1 | 7/2004 | Yang et al. |
| 2006/0009713 A1 | 1/2006 | Flaherty |
| 2006/0195062 A1 | 8/2006 | Gremel |
| 2007/0088278 A1 | 4/2007 | Shue et al. |
| 2011/0160613 A1 | 6/2011 | Schraga |
| 2017/0122846 A1* | 5/2017 | Holmes ................ G01N 33/491 |
| 2017/0202498 A1* | 7/2017 | Tan .................. A61B 5/150572 |
| 2018/0140240 A1 | 5/2018 | Bullington et al. |
| 2019/0091681 A1* | 3/2019 | Nobile ................ B01L 3/50825 |

FOREIGN PATENT DOCUMENTS

| | | |
|---|---|---|
| EP | 0283663 | 9/1988 |
| EP | 0562363 | 9/1993 |
| JP | S5025084 | 3/1975 |
| JP | S63296733 A | 12/1988 |
| JP | H04506024 A | 10/1992 |
| JP | H08505696 A | 6/1996 |
| JP | 2003505185 A | 2/2003 |
| JP | 2003260042 A | 9/2003 |
| JP | 2008132190 A | 6/2008 |
| JP | 2010227616 A | 6/2010 |
| WO | 2005/076733 | 8/2005 |
| WO | 2014/149854 | 9/2014 |
| WO | 2017/074684 | 5/2017 |

* cited by examiner

VACUUM TUBE RECEIVER FOR DRAWING BLOOD THROUGH A PERIPHERAL IV CATHETER

RELATED APPLICATIONS

This application claims the benefit of U.S. Provisional Application No. 62/934,964, filed Nov. 13, 2019, and entitled VACUUM TUBE RECEIVER FOR DRAWING BLOOD THROUGH A PERIPHERAL IV CATHETER, which is incorporated herein in its entirety.

BACKGROUND

Vacuum tubes, such as the BD Vacutainer tubes sold by Becton Dickinson, are commonly used to draw blood from a patient. FIG. 1 provides an example of a common vacuum tube 110 and a corresponding vacuum tube receiver 120. Vacuum tube 110 includes a septum 111 and cap 112 which maintain the vacuum. Vacuum tube receiver 120 includes a housing 121 having a hollow interior 121a and a proximal opening 122 that allows vacuum tube 110 to be inserted into interior 121a. A spike 123, which is surrounded by a shield 123a, is positioned within interior 121a and extends proximally so that it will pierce septum 111 of vacuum tube 110. Vacuum tube receiver 120 may also include an adapter 124 at its distal end by which it is connected to an intravenous (IV) system (e.g., via tubing). When vacuum tube 110 is inserted into interior 121a to cause spike 123 to pierce septum 111, the vacuum within vacuum tube 110 will cause blood to flow into vacuum tube 110.

Oftentimes, vacuum tubes are used with a dedicated blood collection set such as blood collection set 200 shown in FIG. 2. Blood collection set 200 includes vacuum tube receiver 120 and a needle assembly 210 which are fluidly connected via tubing 220. Needle assembly 210 includes a needle adapter 211 and a needle 212. Blood collection set 200 would typically be used when a patient does not have an intravenous catheter (e.g., when a patient visits a physician's office to have blood drawn). In other words, needle 212 would only be inserted into the patient's vasculature long enough to draw blood. For this reason, needle 212 is typically formed of rigid metal that has an upward facing bevel. In blood collection set 200, the length of tubing 220 can also be selected to provide optimal blood flow characteristics. In short, because blood collection set 200 is specifically designed for drawing blood, its characteristics can be tailored to fill a vacuum tube as quickly as possible while minimizing the risk of hemolysis or other blood cell damage.

Vacuum tubes are also commonly used to draw blood via a peripheral IV catheter (PIVC) such as PIVC 300 shown in FIG. 3. PIVC 300 includes a catheter adapter 310 from which a catheter 311 extends and a needle adapter 320 from which a needle 321 extends. Needle 321 is used to insert catheter 311 into a patient's vasculature but is subsequently withdrawn such that only catheter 311 remains within the vasculature. PIVC 300 oftentimes includes tubing 330 with one or more adapters 340 which allow various devices, such as vacuum tube receiver 120, to be connected to PIVC 300.

Using a vacuum tube to draw blood from a PIVC creates various problems that do not exist when a dedicated blood collection set is used. For example, unlike the rigid metal needle 212 of blood collection set 200, catheter 311 of PIVC 300 is typically formed of flexible plastic which increases the likelihood that the catheter opening, which faces distally, may be positioned against the vein wall thereby restricting blood flow. Also, because the diameter of catheter 311 must be large enough to accommodate needle 321, catheter 311 will occlude a larger portion of the vein than needle 212. Further, given that PIVC 300 is designed to be used with many different systems, it cannot be tailored to provide ideal blood flow characteristics to a vacuum tube. As a result, when a vacuum tube is connected, a significant pressure drop may occur within the vein which increases the likelihood of hemolysis or other blood cell damage and may even collapse the vein.

The subject matter claimed herein is not limited to embodiments that solve any disadvantages or that operate only in environments such as those described above. Rather, this background is only provided to illustrate one example technology area where some implementations described herein may be practiced.

SUMMARY

The present disclosure relates generally to vacuum tube receivers that can be used when drawing blood from a patient. More particularly, in some embodiments, the present disclosure relates to vacuum tube receivers that are adapted for use with peripheral IV catheters (PIVCs).

In some embodiments, a vacuum tube receiver may include a housing having a proximal end and a distal end and forming a hollow interior. In some embodiments, the proximal end forms a proximal opening for receiving a vacuum tube into the hollow interior. In some embodiments, the distal end forms an adapter for coupling the vacuum tube receiver to an intravenous system. In some embodiments, the vacuum tube receiver includes a spike that extends proximally into the hollow interior. In some embodiments, the spike includes an opening and forms a blood flow path.

In some embodiments, the opening is an elongated opening having a constant width. In some embodiments, the opening is an elongated opening that includes a proximal portion having a distally increasing width and a distal portion. In some embodiments, the distal portion has a constant width. In some embodiments, the constant width of the distal portion matches a maximum width of the proximal portion.

In some embodiments, the vacuum tube receiver may include an insertion depth control component that includes a stop member. In some embodiments, the insertion depth control component is coupled to the housing and is configured to move between a withdrawn position and an inserted position. In some embodiments, when the insertion depth control component is in the inserted position, the stop member limits insertion of a vacuum tube into the hollow interior. In some embodiments, when the insertion depth control component is in the inserted position, the stop member causes at least an initial length of the proximal portion to extend beyond the septum of the vacuum tube that is positioned against the stop member but prevents the distal portion from extending beyond the septum. In some embodiments, the inserted position is a first inserted position in which the stop member causes only the initial length of the proximal portion to extend beyond the septum. In some embodiments, the insertion depth control component is also configured to move between a second inserted position. In some embodiments, when the insertion depth control component is in the second inserted position, the stop member causes an additional length of the proximal portion to extend beyond the septum of the vacuum tube that is positioned against the stop member but prevents the distal portion from extending beyond the septum.

In some embodiments, the spike further includes a second opening that is spaced distally from the opening. In some embodiments, the vacuum tube receiver includes an insertion depth control component that includes a stop member. In some embodiments, the insertion depth control component is coupled to the housing and is configured to move between a withdrawn position and an inserted position. In some embodiments, when the insertion depth control component is in the inserted position, the stop member limits insertion of a vacuum tube into the hollow interior so that only the opening of the spike extends beyond a septum of the vacuum tube. In some embodiments, when the insertion depth control component is in the withdrawn position, the stop member does not limit insertion of the vacuum tube into the hollow interior so that both the opening and the second opening of the spike extend beyond the septum of the vacuum tube.

In some embodiments, the vacuum tube receiver includes a flow control component having a shaft that inserts into a distal end of the spike and a head that is positioned overtop the distal end of the spike. In some embodiments, the head forms channels through which blood flows to enter the spike. In some embodiments, the head is formed of a flexible material to thereby enable the head to flex in a proximal direction overtop the distal end of the spike when the spike pierces a vacuum tube. In some embodiments, as the head flexes in the proximal direction, an effective size of the channels is reduced to thereby limit the flow of blood into the spike.

In some embodiments, the blood flow path that the spike forms is a primary blood flow path. In some embodiments, the vacuum tube receiver includes a secondary blood flow path. In some embodiments, the vacuum tube receiver also includes a stopper that is configured to move from an initial position in which the stopper blocks the secondary blood flow path to a subsequent position in which the stopper does not block the secondary blood flow path. In some embodiments, the primary blood flow path is configured to cause the stopper to move from the initial position to the subsequent position. In some embodiments, the vacuum tube receiver includes a second spike that forms the secondary blood flow path.

In some embodiments, the vacuum tube receiver includes a vacuum tube having a septum forming a vacuum seal at a distal end of the vacuum tube and one or more additional septums that are proximally spaced from the septum. In some embodiments, each additional septum forms a vacuum seal within the vacuum tube. In some embodiments, a length of the spike is sufficient to pass through the septum and each of the one or more additional septums when the vacuum tube is inserted into the hollow interior of the housing.

In some embodiments, the spike extends proximally a first distance into the hollow interior. In some embodiments, the vacuum tube receiver includes a second spike that extends proximally a second distance into the hollow interior. In some embodiments, the first distance is greater than the second distance. In some embodiments, the second spike also forms a blood flow path.

In some embodiments, a vacuum tube receiver includes a housing having a proximal end and a distal end and forms a hollow interior. In some embodiments, the proximal end forms a proximal opening for receiving a vacuum tube into the hollow interior. In some embodiments, the distal end forms an adapter for coupling the vacuum tube receiver to an intravenous system. In some embodiments, the vacuum tube receiver includes a first spike that extends proximally into the hollow interior. In some embodiments, the first spike forms a first blood flow path. In some embodiments, the vacuum tube receiver includes a second spike that extends proximally into the hollow interior. In some embodiments, the second spike forms a second blood flow path.

In some embodiments, the first spike extends proximally a first distance into the hollow interior and the second spike extends proximally a second distance into the hollow interior. In some embodiments, the first distance is greater than the second distance. In some embodiments, the vacuum tube receiver includes a stopper that is configured to move from an initial position in which the stopper blocks the second blood flow path to a subsequent position in which the stopper does not block the second blood flow path. In some embodiments, the first spike includes an opening that causes vacuum pressure within the first blood flow path to pull the stopper from the initial position to the subsequent position.

In some embodiments, a vacuum tube receiving includes a housing having a proximal end and a distal end and forms a hollow interior. In some embodiments, the proximal end forms a proximal opening for receiving a vacuum tube into the hollow interior. In some embodiments, the distal end forms an adapter for coupling the vacuum tube receiver to an intravenous system. In some embodiments, the vacuum tube receiver includes a spike that extends proximally into the hollow interior. In some embodiments, the spike includes an elongated opening that extends along an outer surface of the spike. In some embodiments, the elongated opening has a proximal portion and a distal portion.

In some embodiments, the vacuum tube receiver includes an insertion depth control component that includes a stop member. In some embodiments, the insertion depth control component is coupled to the housing and is configured to move between a withdrawn position and an inserted position. In some embodiments, when the insertion depth control component is in the inserted position, the stop member limits insertion of a vacuum tube into the hollow interior so that the distal portion of the slotted opening does not extend beyond a septum of the vacuum tube.

It is to be understood that both the foregoing general description and the following detailed description are exemplary and explanatory and are not restrictive of the invention, as claimed. It should be understood that the various embodiments are not limited to the arrangements and instrumentality shown in the drawings. It should also be understood that the embodiments may be combined, or that other embodiments may be utilized and that structural changes, unless so claimed, may be made without departing from the scope of the various embodiments of the present invention. The following detailed description is, therefore, not to be taken in a limiting sense.

BRIEF DESCRIPTION OF THE SEVERAL
VIEWS OF THE DRAWINGS

Example embodiments will be described and explained with additional specificity and detail through the use of the accompanying drawings in which.

DESCRIPTION OF EMBODIMENTS

As used in the present disclosure, the term "distal" refers to a portion of a needle or a catheter assembly or component thereof that is farther from a user, and the term "proximal" refers to a portion of a needle or a catheter assembly or component thereof that is closer to the user. As used in the present disclosure, the term "user" may refer to a clinician, doctor, nurse, or any other care provider and may include support personnel.

Figure 1:
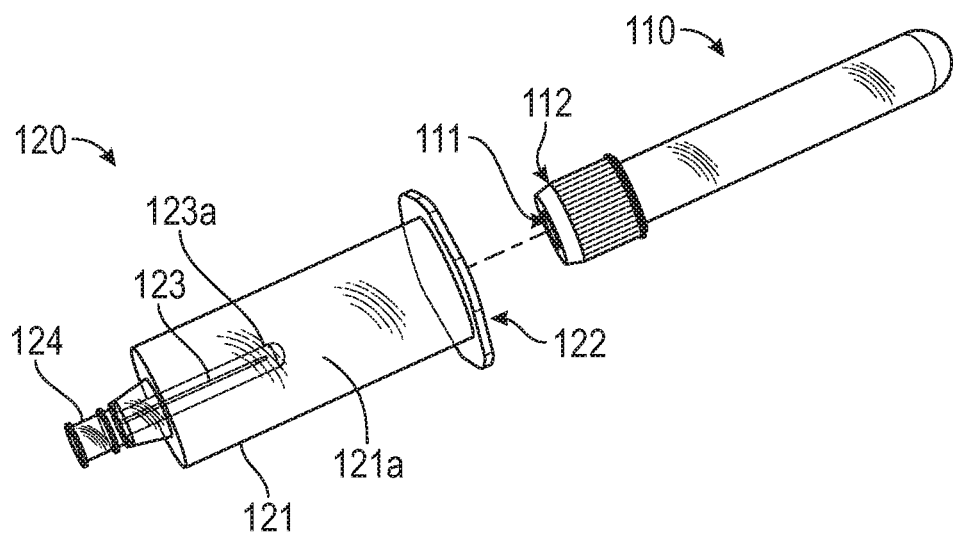
FIG. 1 illustrates a prior art vacuum tube and vacuum tube receiver.
Figure 2:
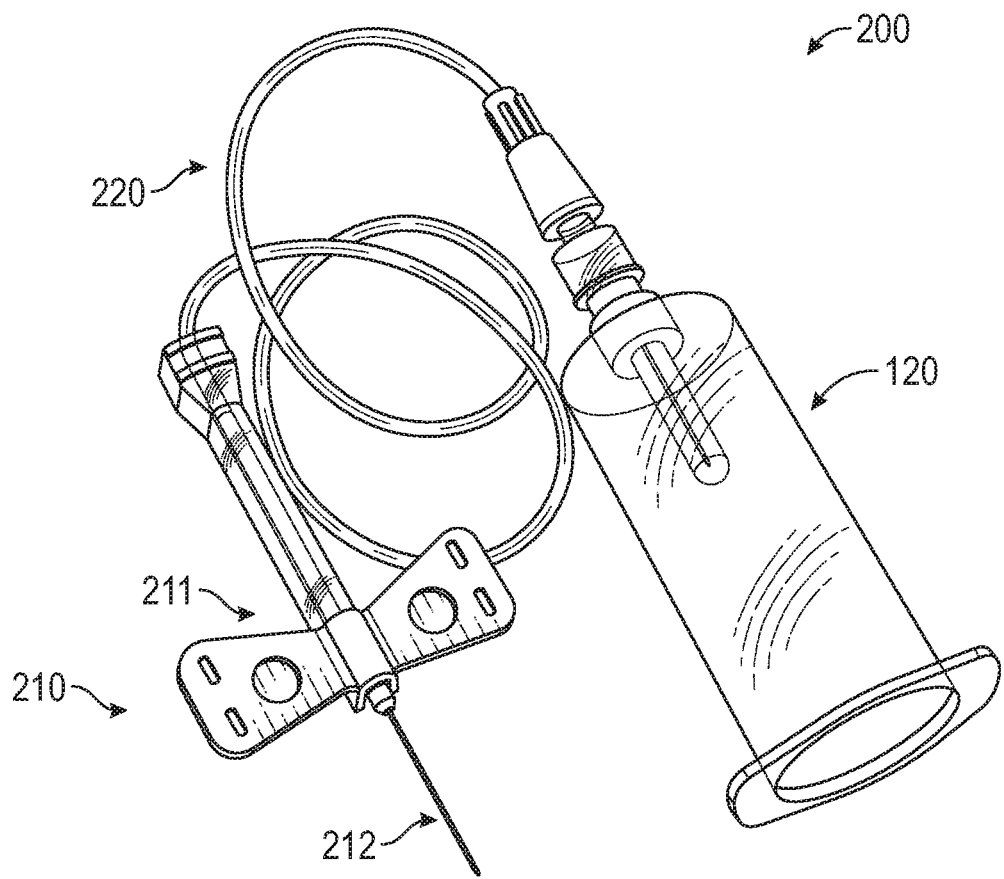
FIG. 2 illustrates a prior art dedicated blood collection set.
Figure 3:
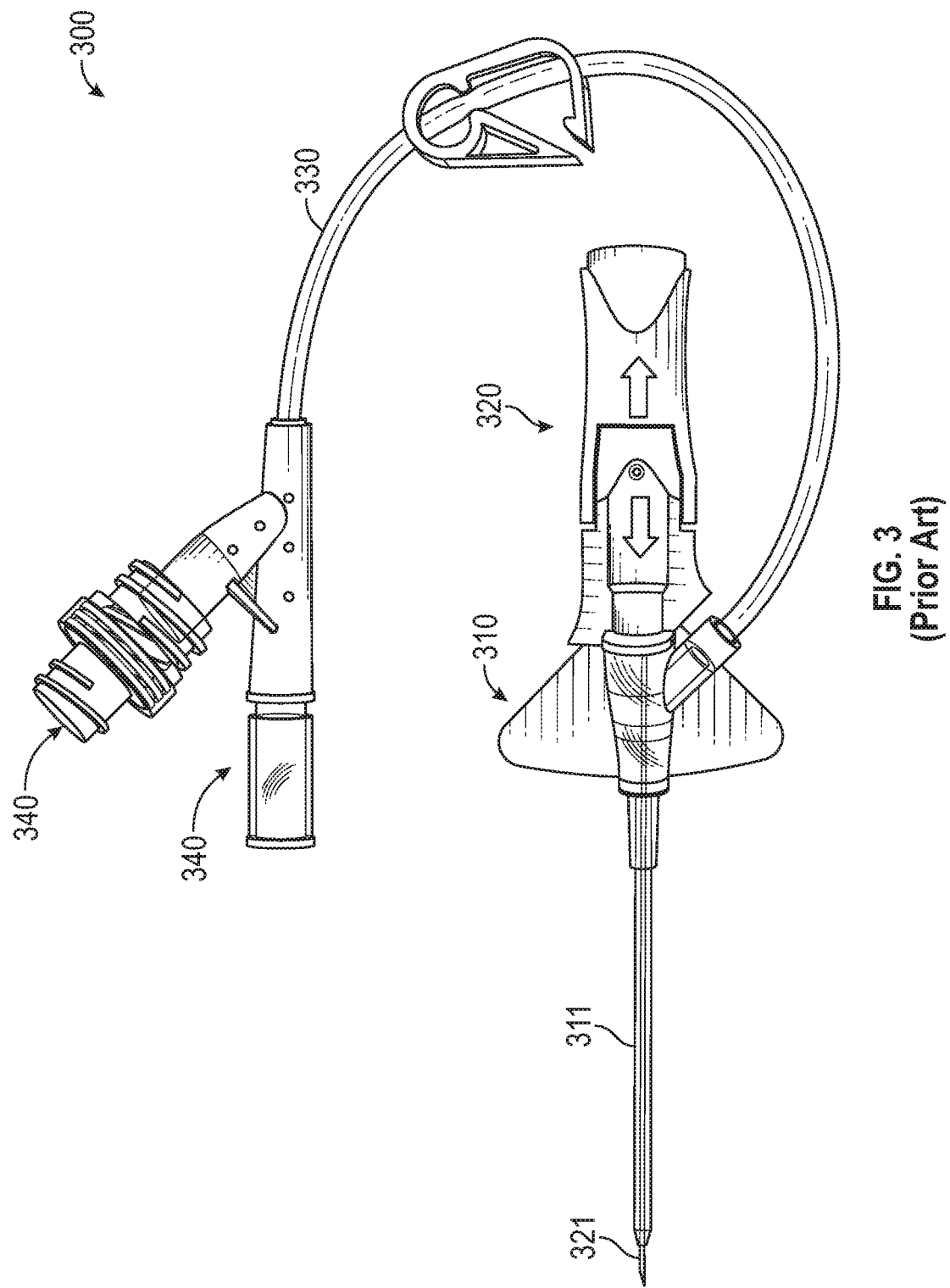
FIG. 3 illustrates a prior art PIVC.
Figure 4:
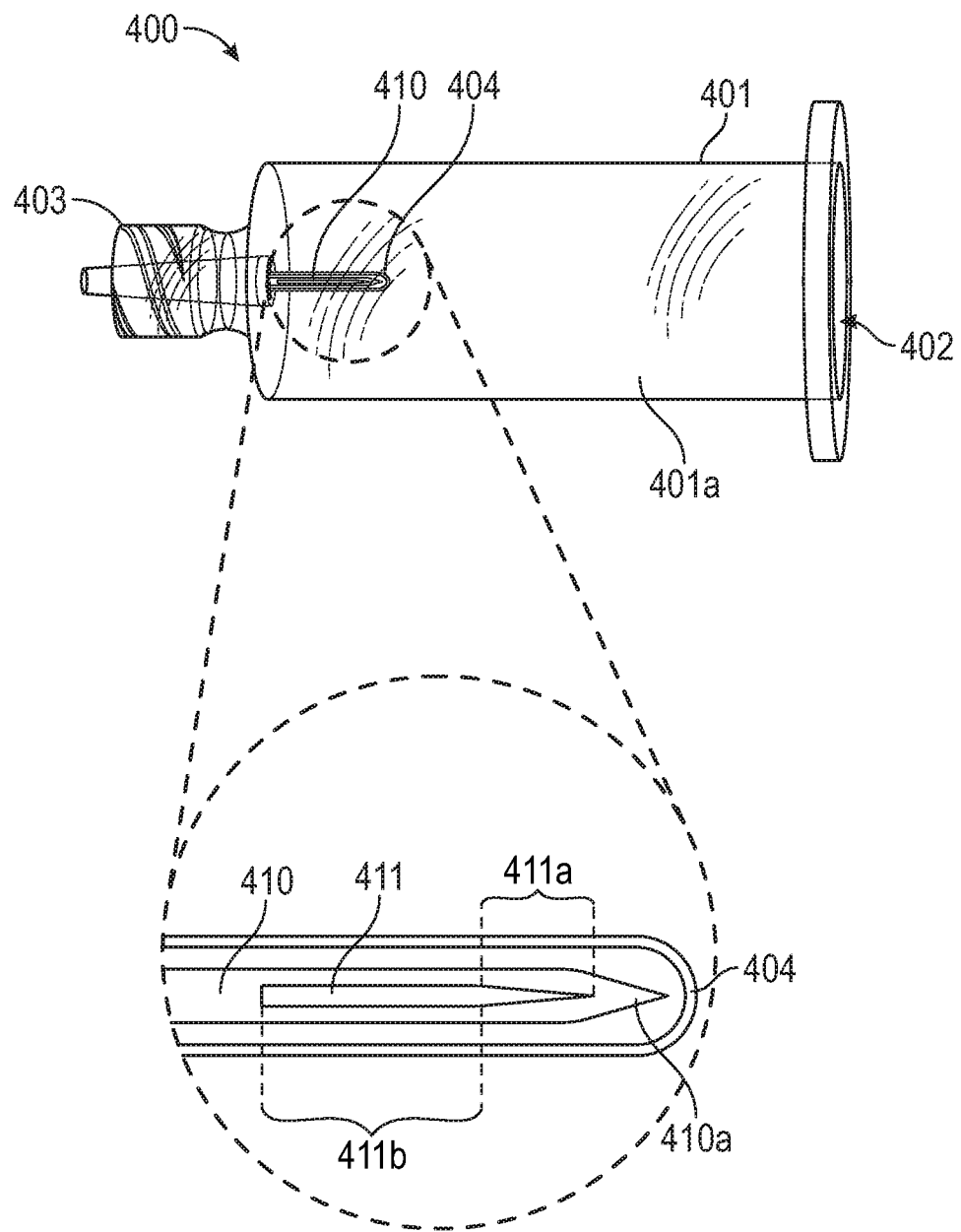
FIG. 4 illustrates a vacuum tube receiver that is configured in accordance with some embodiments.
Figure 4A:
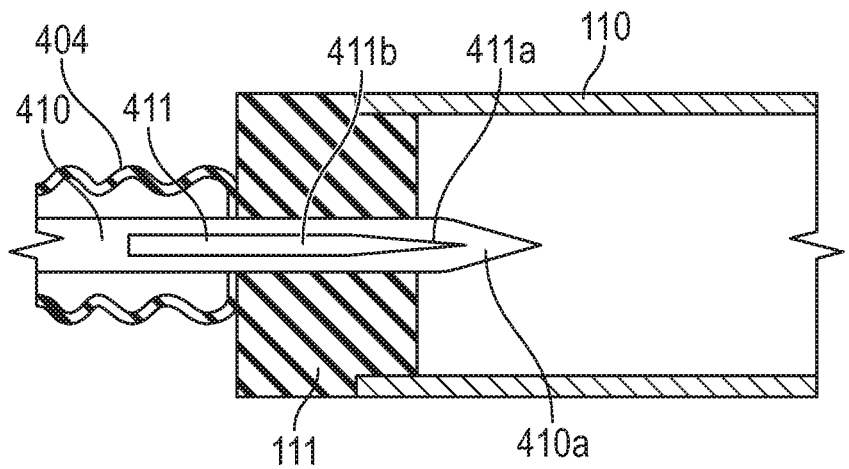
FIGS. 4A-4C illustrate how the vacuum tube receiver of FIG. 4 can be used to control a flowrate or regulate pressure as blood is collected in a vacuum tube.
Figure 4B:
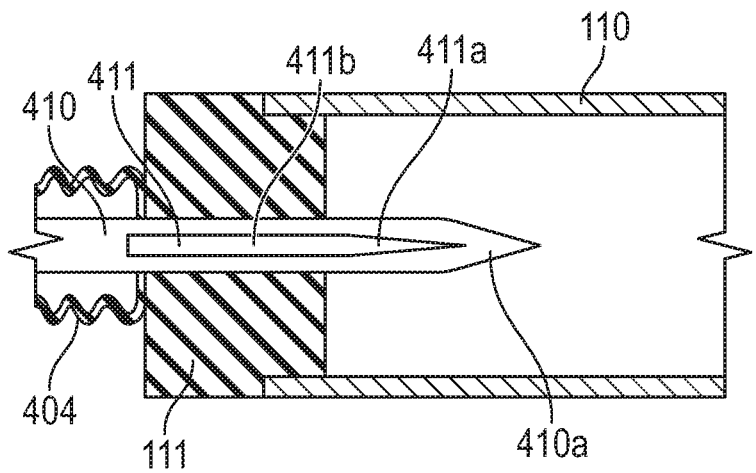
Figure 4C:
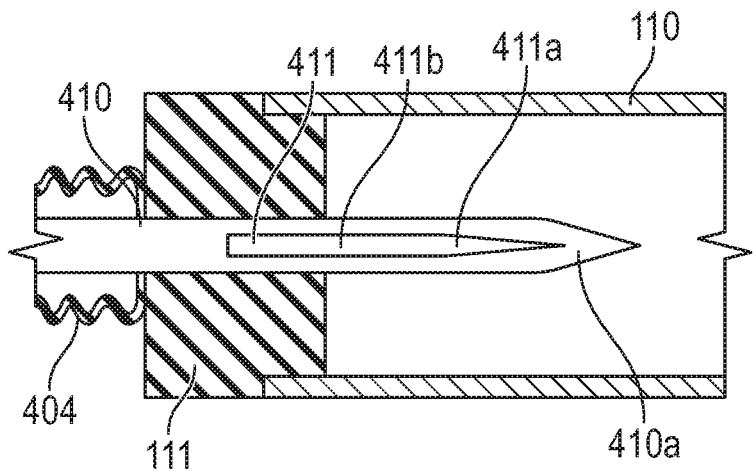

FIG. 4 illustrates a vacuum tube receiver 400 that is configured in accordance with one or more embodiments of the present disclosure. FIGS. 4A-4C provide an example of how vacuum tube receiver 400 can be used. Vacuum tube receiver 400 includes a housing 401 having a hollow interior 401a and a proximal opening 402 through which a vacuum tube, such as vacuum tube 110, may be inserted. Vacuum tube receiver 400 also includes an adapter 403 by which vacuum tube receiver 400 may be connected to a PIVC, such as PIVC 300, or to another IV system. Although adapter 403 is depicted as a Luer Lock adapter, any other type of adapter could be used on vacuum tube receiver 400. Vacuum tube receiver 400 further includes a spike 410 that may typically be surrounded by shield 404.

To enable the user to control the flowrate and/or pressure when collecting blood, spike 410 has an elongated opening 411 (which may be in the form of a slot through the outer surface of spike 410). More particularly, elongated opening 411 includes a proximal portion 411a that is positioned towards a proximal tip 410a of spike 410 and a distal portion 411b that extends distally along the length of spike 410. In some embodiments, both proximal portion 411a and distal portion 411b may have the same, constant width. In other embodiments, such as is shown in FIG. 4, proximal portion 411a can have a distally increasing width while distal portion 411b may have a constant width which matches the maximum width of proximal portion 411a. In other words, the width of elongated opening 411 is initially very small but gradually increases along proximal portion 411a until reaching and maintaining its maximum width along distal portion 411b. In some embodiments, however, the width of elongated opening 411 may also increase along distal portion 411b. Accordingly, at least a portion of elongated opening 411 may be configured with a distally increasing width.

FIGS. 4A-4C illustrate how elongated opening 411 enables the user to control the flowrate of blood into and/or the pressure downstream of vacuum tube 110 during a blood draw. In FIG. 4A, the user has inserted vacuum tube 110 into vacuum tube receiver 400 to cause spike 410 to pierce through shield 404 and septum 111. As shown, at this minimum insertion level, vacuum tube 110 is only inserted far enough to cause the initial length of proximal portion 411a to extend beyond septum 111. Accordingly, the effective hydraulic diameter will be small to thereby minimize the surge of blood flow into vacuum tube 110 and/or prevent a sharp pressure drop within the patient's vasculature. This effective hydraulic diameter can be minimized by configuring proximal portion 411a with a distally increasing width, but a small initial effective hydraulic diameter will still exist when proximal portion 411a is configured with a constant width.

FIG. 4B shows that the user has inserted vacuum tube 110 such that all of proximal portion 411a is positioned beyond septum 111 but distal portion 111b is still blocked by septum 111. At this intermediate insertion level, the effective hydraulic diameter will be increased due to the depth of insertion of elongated opening 411 alone. Additionally, by configuring proximal portion 411a with a distally increasing width, the increase in the effective hydraulic diameter will be more gradual. FIG. 4C shows that the user has inserted vacuum tube 110 such that a majority (or all) of distal portion 111b extends beyond septum 111. At this maximum insertion level, the effective hydraulic diameter will be maximized.

FIGS. 4A-4C may represent different positions to which vacuum tubes may be inserted when drawing blood from a particular type of IV system. For example, a user could insert vacuum tube 100 only to the position shown in FIG. 4A or to the position shown in FIG. 4B when drawing blood from a PIVC but could insert vacuum tube 100 to the position shown in FIG. 4C when drawing blood from a dedicated blood collection set. Additionally or alternatively, FIGS. 4A-4C could represent a sequence of positions during a single blood draw. For example, when drawing blood through a PIVC, a user could intentionally insert vacuum tube 100 gradually from the position shown in FIG. 4A to the position shown in FIG. 4B to thereby cause a gradual increase in flowrate and a corresponding gradual decrease in the pressure differential between vacuum tube 110 and the patient's vasculature when drawing blood from a PIVC. Similarly, when drawing blood through a dedicated blood collection set, a user could intentionally insert vacuum tube 100 gradually from the position shown in FIG. 4A to the position shown in FIG. 4C.

FIGS. 5A-5D illustrate a vacuum tube receiver 500 that is configured in accordance with one or more embodiments of the present disclosure. Vacuum tube receiver 500 can be similar to vacuum tube receiver 400 with the addition of an insertion depth control component 520. Insertion depth control component 520 can include a stop member 521 and an actuating member 522. Stop member 521 can be positioned adjacent to a distal wall 401b of housing 401 and can be configured to slide or otherwise move into hollow interior 401a of housing 401 when insertion depth control component 520 is in an inserted position. In contrast, stop member 521 can be withdrawn from hollow interior 401a when insertion depth control component 520 is in a withdrawn position. Actuating member 522 can be positioned outside housing 401 (or at least accessible from outside housing 401) to allow the user to selectively position insertion depth control component 520 in the withdrawn and inserted positions.

Figure 5A:
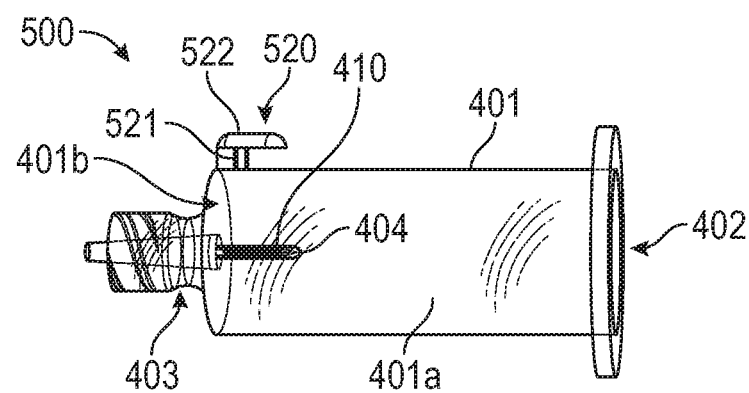
FIGS. 5A-5D illustrate another vacuum tube receiver that is configured in accordance with some embodiments.
Figure 5B:
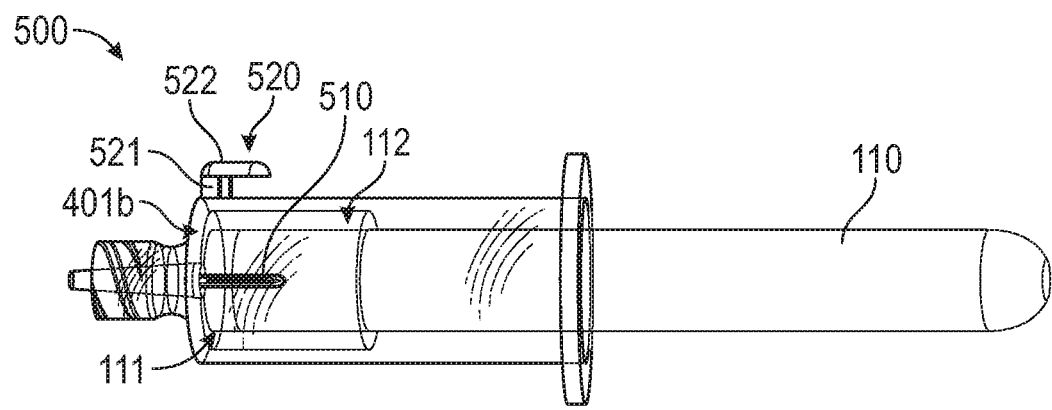

FIGS. 5A and 5B illustrate vacuum tube receiver 500 when insertion depth control component 520 is in the withdrawn position. As shown, actuating member 522 is spaced from housing 401 such that stop member 521 is withdrawn from hollow interior 401a. As shown in FIG. 5B, since stop member 521 is not positioned within hollow interior 401*a*, vacuum tube 110 can be inserted into vacuum tube receiver 500 until it contacts distal wall 401*b*. In embodiments where vacuum tube receiver 500 includes spike 410, FIG. 5B can correspond with FIG. 4C. Accordingly, when vacuum tube receiver 500 will be used to draw blood from a dedicated blood collection set, insertion depth control component 520 can be in the withdrawn position to allow vacuum tube 110 to be inserted to the maximum level.

Figure 5C:
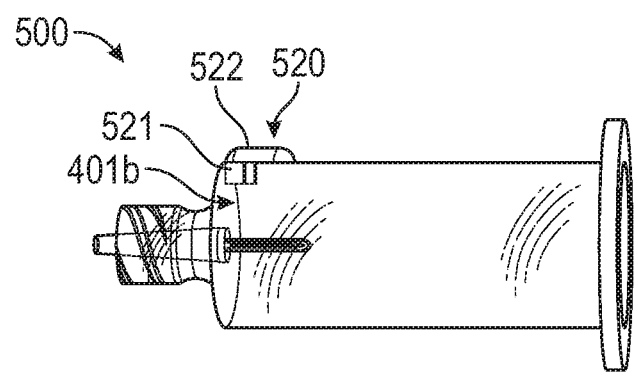
Figure 5D:
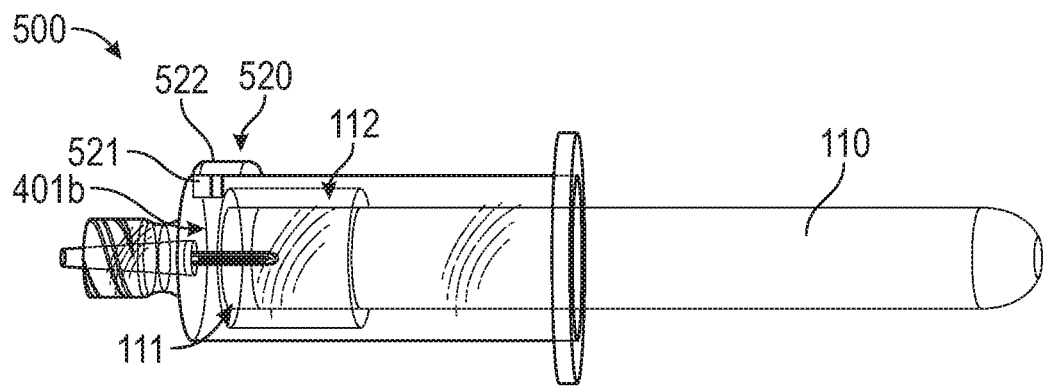

In contrast, FIGS. 5C and 5D illustrate vacuum tube receiver 500 when insertion depth control component 520 is in the inserted position. As shown, actuating member 522 is positioned against (or closer to) housing 401 such that stop member 521 is inserted into hollow interior 401*a*. As shown in FIG. 5D, cap 112 of vacuum tube 110 will contact stop member 521 to thereby limit how far vacuum tube 110 may be inserted into vacuum tube receiver 500. In embodiments where vacuum tube receiver 500 includes spike 410, FIG. 5D may correspond with FIG. 4A or with FIG. 4B. Accordingly, when vacuum tube receiver 500 will be used to draw blood from a PIVC, insertion depth control component 520 can be in the inserted position to prevent vacuum tube 110 from being inserted beyond the minimum level or intermediate level.

In some embodiments, insertion depth control component 520 can be configured to limit insertion of vacuum tube 100 to other depths. For example, stop member 521 could include multiple surfaces which correspond with the insertion levels shown in FIGS. 4A and 4B. As one example only, a first surface of stop member 521 could allow insertion to the intermediate level shown in FIG. 4B when actuating member 422 is in a first position and a second surface of stop member 521 could allow insertion to the minimum level shown in FIG. 4C when actuating member 422 is in a second position. In such embodiments, a user could actuate insertion depth control component 520 to a particular level based on the characteristics of the PIVC or other IV system. For example, due to the PIVC gauge, length, position, etc., it may be optimal to insert vacuum tube 110 to the intermediate level shown in FIG. 4B rather than to the minimum level shown in FIG. 4A.

In some embodiments, the user may adjust insertion depth control component 520 during a blood draw. For example, when using a PIVC, the user may initially place insertion depth control component 520 in the inserted position to prevent vacuum tube 110 from being inserted beyond the minimum level. Then, once blood flow has commenced and the pressure differential has been reduced to a suitable level, the user could transition insertion depth control component 520 to an intermediate position or to the withdrawn position to enable vacuum tube 110 to be inserted farther which in turn will increase the blood flowrate to minimize the collection time.

Figure 6:
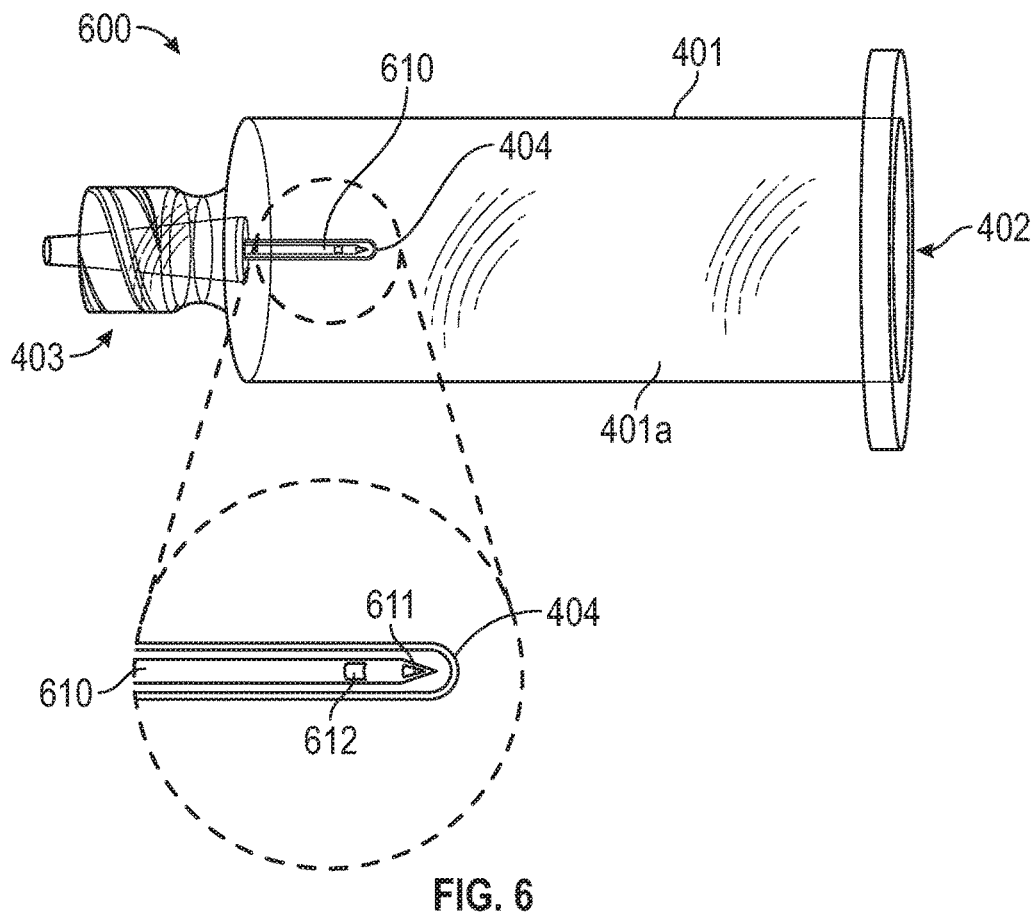
FIGS. 6, 6A and 6B illustrate another vacuum tube receiver that is configured in accordance with some embodiments.
Figure 6A:
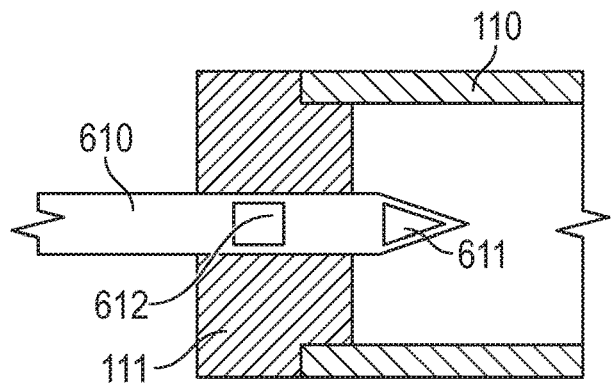
Figure 6B:
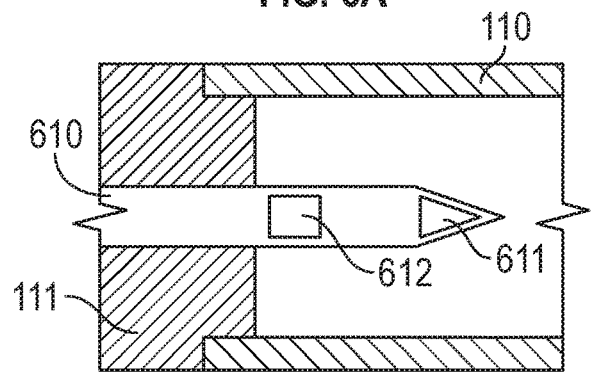

FIGS. 6, 6A and 6B illustrate a vacuum tube receiver 600 that is configured in accordance with one or more embodiments of the present disclosure. Vacuum tube receiver 600 is similar to vacuum tube receiver 400 but employs spike 610. Spike 610 includes a proximal opening 611 positioned at the proximal end of spike 610 and a distal opening 612 that is spaced from proximal opening 611. As shown in FIG. 6A, vacuum tube 110 can be inserted into vacuum tube receiver 600 to a minimum level which will cause proximal opening 611 but not distal opening 612 to be positioned beyond septum 111. In contrast, FIG. 6B shows that vacuum tube 110 has been inserted to a maximum level which causes both proximal opening 611 and distal opening 612 to be positioned beyond septum 111.

When vacuum tube receiver 600 is used to draw blood through a PIVC, vacuum tube 110 can be inserted to the minimum level shown in FIG. 6A to minimize flowrate and prevent a sharp pressure drop in the patient's vasculature. In some embodiments, vacuum tube receiver 600 may also include insertion depth control component 520 to enable the user to prevent vacuum tube 110 from being inserted beyond this minimum level. Similarly, when vacuum tube receiver 600 is used to draw blood through a dedicated blood collection set, vacuum tube 110 can be inserted to the maximum level shown in FIG. 6B. Also, in some embodiments, when vacuum tube receiver 600 is used to draw blood through a PIVC, the user may initially insert vacuum tube 110 to the minimum level and then, after the pressure differential has been reduced, insert vacuum tube 110 to the maximum level to increase the flowrate and reduce the collection time.

Figure 7:
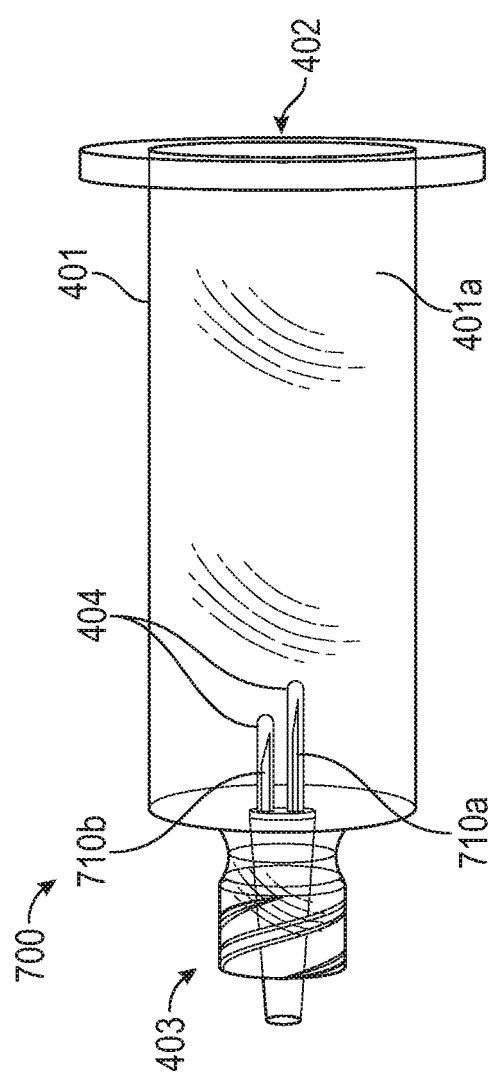
FIG. 7 illustrates another vacuum tube receiver that is configured in accordance with some embodiments.

FIG. 7 illustrates a vacuum tube receiver 700 that is configured in accordance with one or more embodiments of the present disclosure. Vacuum tube receiver 700 is similar to vacuum tube receiver 400 but employs two spikes 710*a*, 710*b*. As shown, spike 710*a* extends proximally farther than spike 710*b*. As a result, when vacuum tube 110 is inserted into vacuum tube receiver 700, spike 710*a* will first pierce through septum 111 thereby allowing blood to initially flow only through spike 710*a*. Then, when vacuum tube 110 is further inserted into vacuum tube receiver 700, spike 710*b* will pierce through septum 111 thereby allowing blood to flow through both spike 710*a* and spike 710*b*. In some embodiments, the gauge of spike 710*a* may be larger than the gauge of spike 710*b* so that the initial flowrate of blood is minimized. Alternatively, an opening or inside diameter of spike 710*a* may be smaller than that of spike 710*b* to minimize the initial flowrate. In any case, the use of spikes 710*a* and 710*b* ensures that the initial flowrate and pressure drop can be controlled while retaining the ability to subsequently obtain a higher flowrate. In some embodiments, vacuum tube receiver 700 may include insertion depth control component 520 which can be used to prevent spike 710*b* from passing beyond septum 111 when vacuum tube receiver 700 is used to draw blood through a PIVC.

Figure 8:
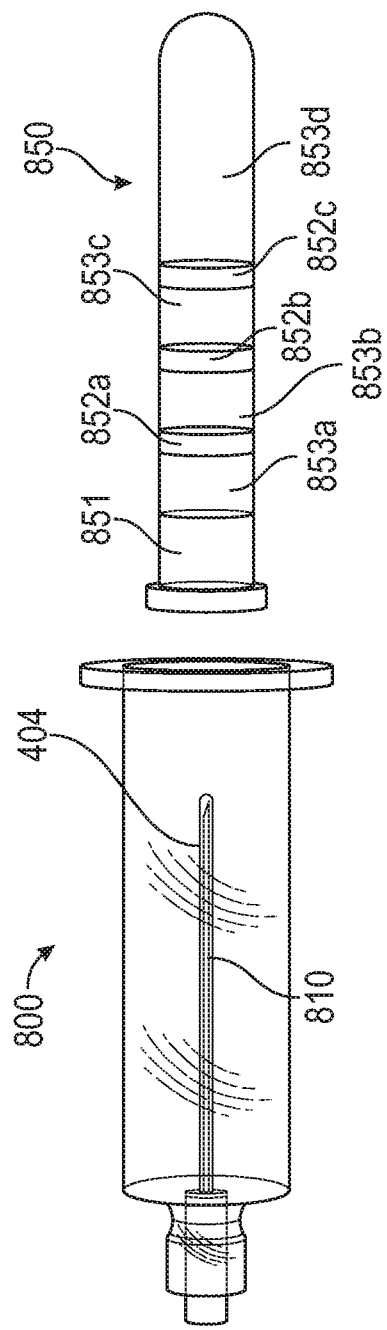
FIG. 8 illustrates another vacuum tube receiver and a corresponding vacuum tube that are configured in accordance with some embodiments.

FIG. 8 illustrates a vacuum tube receiver 800 and a corresponding vacuum tube 850 that are configured in accordance with one or more embodiments of the present disclosure. Vacuum tube receiver 800 is similar to vacuum tube receiver 400 but includes a longer spike 810. Vacuum tube 850 includes septum 851, which can be similar to septum 111, but also includes additional septums 852*a*-852*c* which are spaced within vacuum tube 800 to create multiple vacuum pockets 853*a*-853*d*. As vacuum tube 850 is inserted into vacuum tube receiver 800, spike 810 will initially pierce septum 851 thereby causing blood to flow into vacuum pocket 853*a*. Given the smaller volume of vacuum pocket 853*a* relative to the overall volume of vacuum tube 850, a smaller pressure drop will occur once spike 810 passes through septum 851 than would otherwise occur if vacuum tube 850 only included septum 851. As vacuum tube 850 is further inserted, spike 810 will sequentially pierce septums 852*a* and 852*b*. Due again to the smaller volumes of vacuum pockets 853*b* and 853*c*, a smaller pressure drop will again occur. Finally, spike 810 will pass through septum 852*c* causing blood to flow into vacuum pocket 853*d*. Although vacuum pocket 853*d* has a larger volume than the other vacuum pockets, a sharp drop in pressure will not occur since the pressure differential will have been gradually reduced as spike 810 passed through vacuum pockets 853*a*-853*c*. Although vacuum tube 850 is shown having three additional septums, in some embodiments, vacuum tube 850 could have one additional septum, two additional septums or more than three additional septums.

Figure 9:
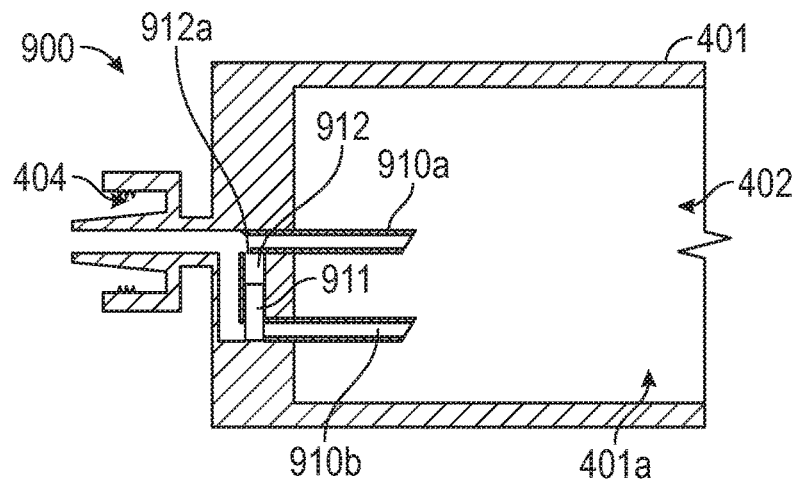
FIGS. 9, 9A and 9B illustrate another vacuum tube receiver that is configured in accordance with some embodiments.

FIG. 9 illustrates a vacuum tube receiver 900 that is configured in accordance with one or more embodiments of the present disclosure. Vacuum tube receiver 900 is similar to vacuum tube receiver 400 but employs a stopper 911 to provide a secondary flow path after blood has started flowing through the primary flow path. As shown, vacuum tube receiver 900 includes a first spike 910*a* which defines the primary flow path and a second spike 910*b* which defines the secondary flow path. Stopper 911 is contained within a channel 912 and is initially positioned within the secondary flow path so that no blood will initially flow through spike 910*b*. Channel 912 is connected to the primary flow path via an opening 912*a* in spike 910*a*.

Figure 9A:
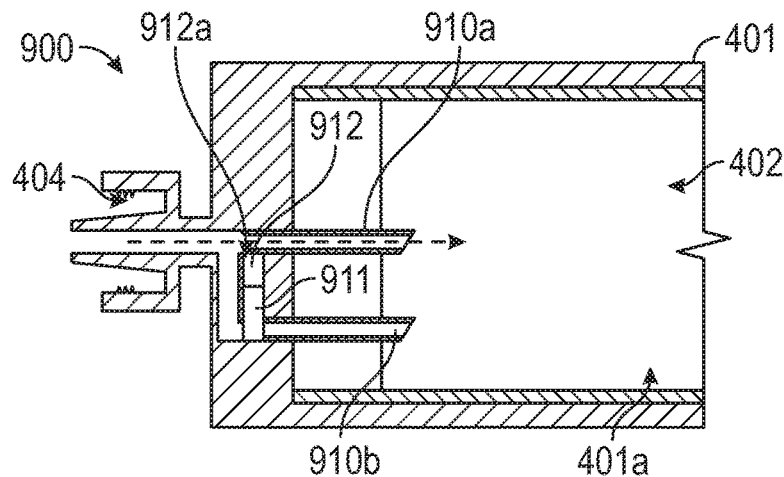
Figure 9B:
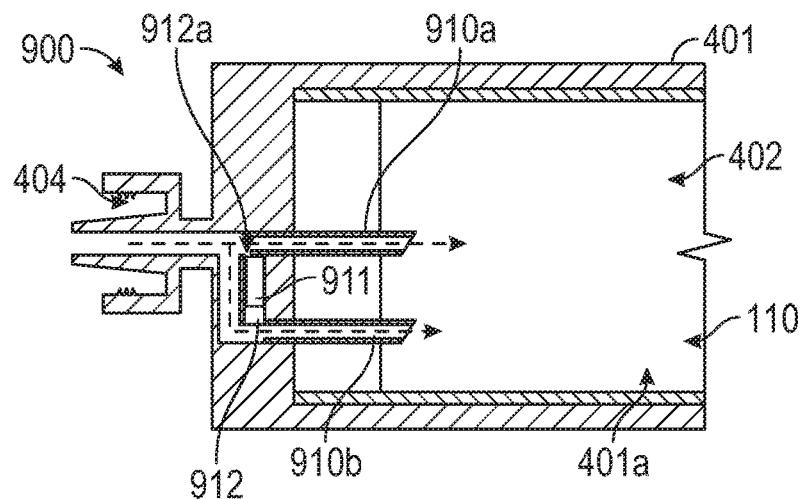

As represented in FIG. 9A, when vacuum tube 110 is inserted into vacuum tube receiver 900, spikes 910*a* and 910*b* will pierce septum 111 thereby causing blood to flow into vacuum tube 110. With stopper 911 in the initial position, the flow of blood will be limited to the primary flow path through spike 910*a*. However, due to the vacuum within vacuum tube 110, stopper 911 will be pulled towards opening 912*a* and will eventually reach the position shown in FIG. 9B thereby opening the secondary flow path through spike 910*b*. Stopper 911 and/or channel 912 can be configured to hinder stopper 911's movement towards opening 912*a* so that the secondary flow path is not immediately opened when septum 111 is pierced. This can minimize the pressure drop that would otherwise occur if both flow paths were immediately opened. In some embodiments, this secondary flow path can be established using only spike 910*a*. Such embodiments would be substantially the same as shown in FIG. 9 except that the secondary flow path would connect back to spike 910*a* rather than forming the separate spike 910*b*.

Figure 10A:
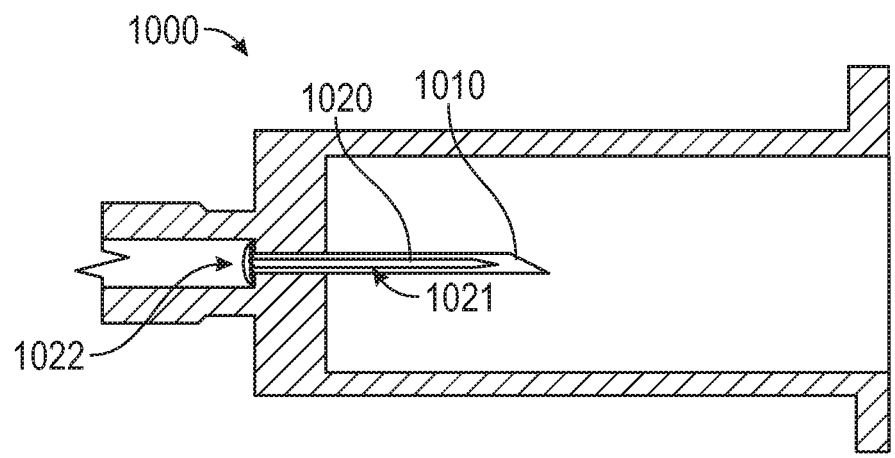
FIGS. 10A and 10B illustrate another vacuum tube receiver that is configured in accordance with some embodiments.
Figure 10B:
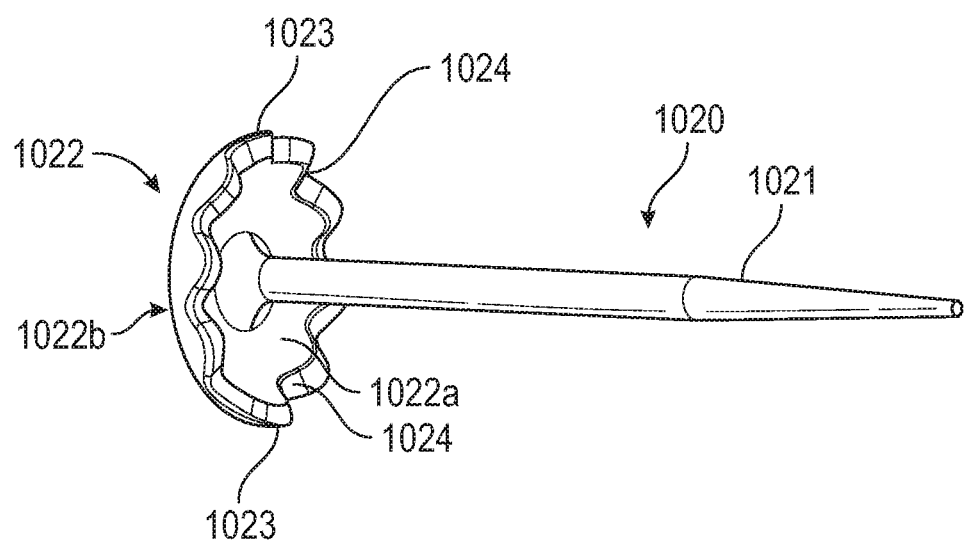

FIG. 10 illustrates a vacuum tube receiver 1000 that is configured in accordance with one or more embodiments of the present disclosure. Vacuum tube receiver 1000 is similar to vacuum tube receiver 400 but employs a flow control component 1020 that inserts into the distal end of needle 1010. Flow control component 1020 functions to minimize the pressure drop and flowrate that initially occurs when vacuum tube 110 is inserted into vacuum tube receiver 1000 while also allowing the flowrate to increase to thereby minimize the collection time.

FIG. 10A provides a detailed view of flow control component 1020. As shown, flow control component 1020 includes a shaft 1021 that inserts into the distal end of needle 1010 so that head 1022 is positioned overtop the distal opening of needle 1010. Head 1022 has a mushroom shape with a proximal-facing surface 1022*a* that is concave and a distal-facing surface 1022*b* that is convex. The edge of head 1022 includes alternating extensions 1023 and channels 1024. Extensions 1023 can be positioned against an internal wall surrounding spike 1010 such that blood flows through channels 1024 to enter spike 1010.

When spike 1010 is initially inserted into vacuum tube 110, the vacuum will pull flow control component 1020 in a proximal direction. Due to its mushroom shape, head 1022 will flex proximally which reduces the effective size of channels 1024 to thereby limit the flowrate of blood and minimizing the pressure drop that will occur in the patient's vasculature. As the pressure differential gradually reduces, the vacuum force on flow control component 1020 will likewise reduce. This reduction in the vacuum force will allow head 1022 to return towards its normal shape which increases the effective size of channels 1024 thereby increasing the flowrate of blood. Accordingly, flow control component 1020 minimizes the initial pressure drop without sacrificing subsequent flowrate.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present invention have been described in detail, it should be understood that the various changes, substitutions, and alterations could be made hereto without departing from the spirit and scope of the invention. It should be understood that the embodiments may be combined.

We claim:

1. A vacuum tube receiver comprising:
 a housing having a proximal end and a distal end and forming a hollow interior, the proximal end forming a proximal opening for receiving a vacuum tube into the hollow interior, the distal end forming an adapter for coupling the vacuum tube receiver to an intravenous system;
 a spike that extends proximally into the hollow interior, the spike including an elongated opening including a proximal portion positioned towards a proximal tip of the spike and a distal portion that extends distally along a length of the spike, the proximal portion having a distally increasing width and the distal portion having a constant width that matches a maximum width of the proximal portion, the elongated opening forming a blood flow path; and
 an insertion depth control component that includes a stop member, the insertion depth control component being coupled to the housing and being configured to move the stop member between a withdrawn position outside of the hollow interior and an inserted position inside of the hollow interior, wherein, with the insertion depth control component in the inserted position, the stop member is configured to limit insertion of the vacuum tube into the hollow interior.

2. The vacuum tube receiver of claim 1, wherein, with the insertion depth control component in the inserted position, the stop member is configured to cause at least an initial length of the proximal portion to extend beyond a septum of the vacuum tube that is positioned against the stop member but is configured to prevent the distal portion from extending beyond the septum.

3. The vacuum tube receiver of claim 2, wherein the inserted position is a first inserted position in which the stop member causes only the initial length of the proximal portion to extend beyond the septum, and wherein the insertion depth control component is also configured to move between a second inserted position, wherein, with the insertion depth control component in the second inserted position, the stop member is configured to cause an additional length of the proximal portion to extend beyond the septum of the vacuum tube that is positioned against the stop member but prevent the distal portion from extending beyond the septum.

4. The vacuum tube receiver of claim 1, wherein the spike further includes a second opening that is spaced distally from the opening.

5. The vacuum tube receiver of claim 4, further comprising:
 wherein, with the insertion depth control component in the inserted position, the stop member is configured to limit insertion of a vacuum tube into the hollow interior so that only the opening of the spike extends beyond a septum of the vacuum tube, whereas, with the insertion depth control component in the withdrawn position, the stop member is configured such that it does not limit insertion of the vacuum tube into the hollow interior so that both the opening and the second opening of the spike extend beyond the septum of the vacuum tube.

6. The vacuum tube receiver of claim 1, wherein the blood flow path that the spike forms is a primary blood flow path, the vacuum tube receiver further comprising:
   a secondary blood flow path; and
   a stopper that is configured to move from an initial position in which the stopper blocks the secondary blood flow path to a subsequent position in which the stopper does not block the secondary blood flow path, wherein the primary blood flow path is configured to cause the stopper to move from the initial position to the subsequent position.

7. The vacuum tube receiver of claim 6, further comprising:
   a second spike that forms the secondary blood flow path.

8. The vacuum tube receiver of claim 1, wherein the insertion depth control component includes an actuating member positioned outside and spaced from the housing, the actuating member configured to control an insertion depth of the stop member into the hollow interior of the housing.

9. A vacuum tube receiver comprising:
   a housing having a proximal end and a distal end and forming a hollow interior, the proximal end forming a proximal opening for receiving a vacuum tube into the hollow interior, the distal end forming an adapter for coupling the vacuum tube receiver to an intravenous system;
   a spike that extends proximally into the hollow interior, the spike including an opening and forming a blood flow path;
   an insertion depth control component that includes a stop member, the insertion depth control component being coupled to the housing and being configured to move the stop member between a withdrawn position outside of the hollow interior and an inserted position inside of the hollow interior, wherein, with the insertion depth control component in the inserted position, the stop member is configured to limit insertion of the vacuum tube into the hollow interior; and
   a flow control component having a shaft that inserts into a distal end of the spike and a head that is positioned overtop the distal end of the spike, the head forming channels through which blood flows to enter the spike.

10. The vacuum tube receiver of claim 9, wherein the head is formed of a flexible material to thereby enable the head to flex in a proximal direction overtop the distal end of the spike when the spike pierces a vacuum tube, wherein, the head is configured to flex in the proximal direction, resulting in an effective size of the channels to be reduced to thereby limit the flow of blood into the spike.

11. A vacuum tube receiver comprising:
   a housing having a proximal end and a distal end and forming a hollow interior, the proximal end forming a proximal opening for receiving a vacuum tube into the hollow interior, the distal end forming an adapter for coupling the vacuum tube receiver to an intravenous system;
   a spike that extends proximally into the hollow interior, the spike including an opening and forming a blood flow path; and
   an insertion depth control component that includes a stop member, the insertion depth control component being coupled to the housing and being configured to move the stop member between a withdrawn position outside of the hollow interior and an inserted position inside of the hollow interior, wherein, with the insertion depth control component in the inserted position, the stop member is configured to limit insertion of the vacuum tube into the hollow interior;
   wherein the vacuum tube has a septum forming a vacuum seal at a distal end of the vacuum tube and one or more additional septums that are proximally spaced from the septum, each additional septum forming a vacuum seal within the vacuum tube; and
   wherein a length of the spike is sufficient to pass through the septum and each of the one or more additional septums when the vacuum tube is inserted into the hollow interior of the housing.

12. A vacuum tube receiver comprising:
   a housing having a proximal end and a distal end and forming a hollow interior, the proximal end forming a proximal opening for receiving a vacuum tube into the hollow interior, the distal end forming an adapter for coupling the vacuum tube receiver to a peripheral IV catheter or to another IV system;
   a first spike that extends proximally a first distance into the hollow interior forming a first blood flow path; and
   a second spike that extends proximally a second distance into the hollow interior, the first distance being greater than the second distance, the second spike also forming a second blood flow path, wherein the first spike has an inside diameter that is smaller than an inside diameter of the second spike.

13. A vacuum tube receiver comprising:
   a housing having a proximal end and a distal end and forming a hollow interior, the proximal end forming a proximal opening for receiving a single vacuum tube into the hollow interior, the distal end forming an adapter for coupling the vacuum tube receiver to an intravenous system; and
   a first spike that extends proximally into the hollow interior, the first spike forming a first blood flow path; and
   a second spike that extends proximally into the hollow interior, the second spike forming a second blood flow path,
   wherein each of the first spike and the second spike is configured to pierce a septum of the single vacuum tube and wherein the first spike and the second spike are connected by a channel extending between the first spike and the second spike; and
   a stopper located in the channel, the stopper configured to move from an initial position in which the stopper blocks the second blood flow path to a subsequent position in which the stopper does not block the second blood flow path.

14. The vacuum tube receiver of claim 13, wherein the first spike extends proximally a first distance into the hollow interior and the second spike extends proximally a second distance into the hollow interior, the first distance being greater than the second distance.

15. The vacuum tube receiver of claim 13, wherein the first spike includes an opening that causes vacuum pressure within the first blood flow path to pull the stopper from the initial position to the subsequent position.

* * * * *